US008593475B2

(12) United States Patent
Smithers et al.

(10) Patent No.: US 8,593,475 B2
(45) Date of Patent: Nov. 26, 2013

(54) SYSTEMS AND METHODS FOR DYNAMIC PROCEDURAL TEXTURE GENERATION MANAGEMENT

(75) Inventors: Andi Terrence Smithers, San Diego, CA (US); Rachid El Guerrab, San Diego, CA (US); Baback Elmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 12/903,408

(22) Filed: Oct. 13, 2010

(65) Prior Publication Data

US 2012/0092366 A1 Apr. 19, 2012

(51) Int. Cl.
| | |
|---|---|
| *G06F 15/80* | (2006.01) |
| *G09G 5/36* | (2006.01) |
| *G06T 11/40* | (2006.01) |
| *G09G 5/00* | (2006.01) |
| *G06K 9/40* | (2006.01) |
| *G06K 9/36* | (2006.01) |
| *G06K 9/54* | (2006.01) |

(52) U.S. Cl.
USPC ........... 345/582; 345/587; 345/505; 345/545; 345/552; 382/254; 382/276; 382/303; 382/304; 382/305

(58) Field of Classification Search
USPC ................ 345/418, 581–582, 584, 606, 618, 345/501–505, 506, 522, 545, 548–552, 587, 345/473, 474; 382/254, 276, 282, 285, 382/301–303, 304, 305, 307; 463/30–34, 463/43
See application file for complete search history.

(56) References Cited

U.S. PATENT DOCUMENTS

| | | | | |
|---|---|---|---|---|
| 5,696,892 | A * | 12/1997 | Redmann et al. | 345/582 |
| 6,181,346 | B1 | 1/2001 | Ono et al. | |
| 6,288,730 | B1 | 9/2001 | Duluk, Jr. et al. | |
| 6,359,630 | B1 | 3/2002 | Morse et al. | |
| 6,538,654 | B1 * | 3/2003 | Rose et al. | 345/473 |
| 6,778,181 | B1 * | 8/2004 | Kilgariff et al. | 345/582 |
| 6,919,904 | B1 * | 7/2005 | Kilgariff | 345/582 |
| 7,061,502 | B1 * | 6/2006 | Law et al. | 345/592 |
| 7,292,242 | B1 | 11/2007 | Wittenbrink et al. | |
| 2002/0080143 | A1 * | 6/2002 | Morgan et al. | 345/581 |
| 2007/0165035 | A1 * | 7/2007 | Duluk et al. | 345/506 |
| 2008/0049015 | A1 | 2/2008 | Elmieh et al. | |

FOREIGN PATENT DOCUMENTS

| | | | |
|---|---|---|---|
| WO | WO2004114223 | A1 | 12/2004 |
| WO | WO2005122096 | A1 | 12/2005 |

OTHER PUBLICATIONS

Aleksic M. et al., "Architecture support for window environments", System Sciences, Proceedings of the Twenty-Fifth Hawaii International Conference on Kauai, HI, USA Jan. 7-10, 1992, Los Alamitos, CA, USA, IEEE Comput. Soc, US, vol. i, Jan. 7, 1992, pp. 506-514, XP010025881, DOI: 10.1109/HICSS.1992.183200, ISBN: 978-0-8186-2420-9.
International Search Report and Written Opinion—PCT/US2011/051077—ISA/EPO—Jan. 31, 2012.
Partial International Search Report—PCT/US2011/051077—ISA/EPO—Dec. 8, 2011.

(Continued)

*Primary Examiner* — Sajous Wesner
(74) *Attorney, Agent, or Firm* — Nicholas A. Cole

(57) ABSTRACT

Methods and apparatuses for scheduling and storing media creation are described. Methods and apparatuses for rendering a plurality of vector graphic objects on a display are also described.

55 Claims, 17 Drawing Sheets

(56) References Cited

OTHER PUBLICATIONS

Lefebvre S., et al., "Unified Texture Management for Arbitrary Meshes", Tech. Rep. 5210, Inria, May 2004, pp. 20.

Rhoades, et al., "Real-time procedural textures," Proceedings of the 1992 symposium on Interactive 3D graphics, 1992, 95-100. published in Jun. 1992.

* cited by examiner

SYSTEMS AND METHODS FOR DYNAMIC PROCEDURAL TEXTURE GENERATION MANAGEMENT

BACKGROUND

In conventional multimedia, the final displayed image output may be comprised of disparate media sources that are composited together to create the desired image output. In some cases the individual media source images are each created through processes which have distinct performance, power, and interactivity costs. For example, a media source can describe a final image through the computation of instructions that describes curves, paths and paint brushes. The latency of the composition process is typically related to the sum of the total latencies for processing each media source included in the final image. This latency is a key factor in determining the quality and responsiveness of the overall device experience. The lower the overall composition latency the more responsive the device will feel and the higher the latency, the more sluggish.

In traditional hardware accelerated graphics applications, multiple resolutions of the same texture are kept on a server or on attached media. The texture is then loaded into a graphics processing unit (GPU) at runtime. The GPU selects the most-appropriate texture size based on the size of the texture on the screen and various other quality metrics. In some composition scenarios, the texture is dynamic or created through other processes. For example, a texture can be a media source that describes a final image through the computation of instructions that describes curves, paths and paint brushes. These media sources can be evaluated at multiple resolutions such that, no matter what size they take on screen, they have a pixel-perfect definition. In some applications, the user has the option to zoom in on these textures, which requires recomputation of the media at an appropriate resolution for a pixel-perfect display. In such scenarios, a limiting factor is the amount of memory utilized by these external processes. It is impossible to compute and store all resolutions of each texture due to memory constraints.

Accordingly, what is needed is an efficient mechanism to quickly create the final images when needed. What is also needed are systems and methods for controlling the performance of image creation in a manner that utilizes scene-specific knowledge to determine media requirements for individual media sources, and then limiting processing to particular media sources with certain media requirements.

SUMMARY

This disclosure relates generally to methods and apparatuses for scheduling and storing media creation.

In one aspect, this disclosure relates to a computer-implemented method for receiving a texture from a frame. The method may include determining whether the texture needs to be recreated. The method may also include creating, based on a determination that the texture needs to be recreated, a generated texture based on the texture. The method may further include storing the generated texture in storage for later use.

According to another aspect, an apparatus is also disclosed. The apparatus may include a memory that contains a recreated texture. The recreated texture may be selectively created based on a determination that the texture is an animated texture, or that no suitable, previously-generated representation of the texture is stored in the memory. The apparatus may further include a graphics engine in an embedded device. The graphics engine may be configured to render a user interface based upon the recreated texture.

In yet another aspect, this disclosure relates to methods and systems for rendering graphic objects. The methods and systems may determine an intersection region of a vector graphics object and a display plane. The methods and systems may also determine a quad defining the intersection region. The methods and systems may further rasterize the quad.

According to yet another aspect, methods and systems for rendering a plurality of vector graphic objects on a display are disclosed. The methods of systems may determine a set of sorted objects by sorting the objects based on a layering from top to bottom. Once the set of sorted objects is determined, an on-screen area of the top object of the sorted objects is determined. The methods and systems may further rasterize the on-screen area of the top object. The next lower object from the set of sorted objects may be retrieved, and an on-screen area of the next lower object may be determined. The methods and systems may also determine a non-overlapped area of the on-screen area of the next lower object. The methods and systems may further rasterizing the non-overlapped area and render the rasterized non-overlapped area.

Additional aspects are further described below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Figure 1:
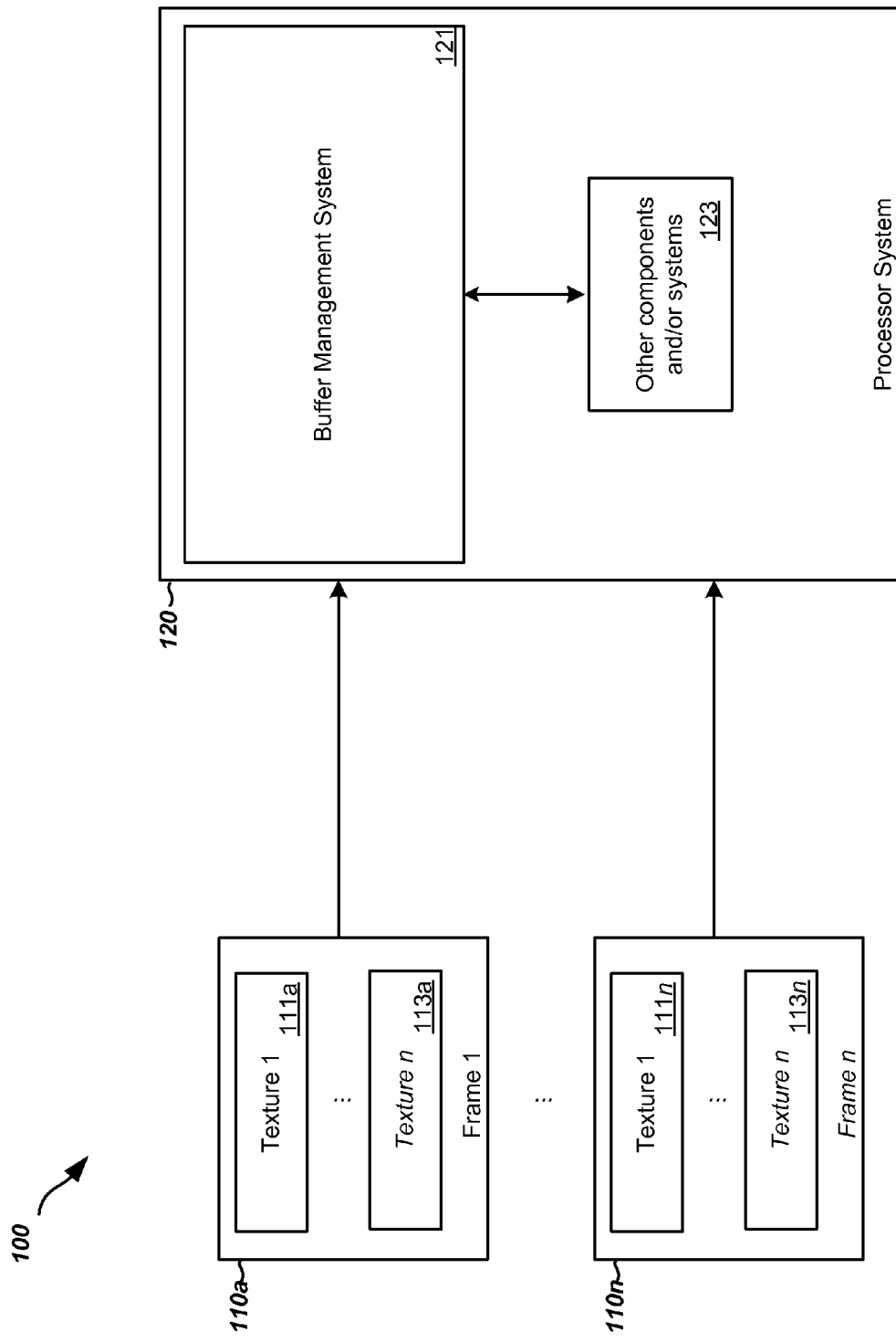
FIG. 1 illustrates a dynamic procedural texture generation management system.

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways.

For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

In various aspects, the techniques and apparatus described herein may be used for development, editing and/or generating output for computer graphics applications, including 3D computer graphics applications configured for execution on mobile devices. These mobile devices may be cellular phones, PDAs or other devices disposed for use in wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks as well as other communications networks.

Dynamic procedural texture generation management may be accomplished in various computing systems. Such computing systems may include an authoring environment that includes computer hardware component such as servers, monitors, I/O devices, network connection devices, as well as other associated hardware for managing texture generation. In addition, the authoring environment may include one or more application programs configured to receive, convert, process, store, retrieve, transfer and/or export data and other content and information.

The present invention generally relates to dynamic management of texture generation to reduce latency and other costs associated with generating one or more textures for a given frame. Aspects of the invention include sequential or parallel processing of texture generation. Such processing may include analyzing one or more textures, scheduling of texture generation, storing of generated textures, and rendering a frame for display on various screen sizes based on one or more stored textures.

For example, analysis of a texture may include identifying requirements for the texture in relation to the final rendered frame associated with that texture, or in relation to a related texture or a related frame. Based on the requirements (e.g., the texture is changing across frames or in relation to other textures, or the viewed dimensions of the texture has changed), the texture may be generated, stored in memory (e.g., cache), and then used for frame rendering on a screen.

The generation of the texture may be controlled by the size of the screen. The generation of the texture may further be controlled by its importance in relation to other textures of greater or less importance. Such importance may be measured by various methods, including a proximity measurement that determines where the texture appears on the screen in relation to a viewer and other textures (e.g., the texture may be used in relation to an object in the background of an image, or it may be used in the foreground), and a movement measurement that determines if the texture relates to an animated object that is moving in relation to successive frames.

Depending on storage resources, the generated texture may be stored for any period of time. For example, the storage of a generated texture may be based on the last time the generated texture was used in relation to when other generated textures were used, or when the generated texture is expected to be used.

Additional aspects of the present invention may include generating only certain portions of textures. Such a generation scheme leads to more-efficient use of system resources.

The determination of which portion to generate may be made by various methods, including a determination that only the certain portion is visible to a viewer.

Attention is now directed to the figures. FIG. 1 depicts a dynamic procedural texture generation management system 100. As shown in FIG. 1, one or more frames 110a-n may be received by a processor system 120. Each frame 110a-n may include one or more textures 111-113. The processor system 120 includes a buffer management system 121 and other components 123. The other components 123 may include memory, one or more servers or other processor elements, one or more displays, and one or more user I/O devices (e.g., keyboards, mice, tablets or other input devices).

Figure 2:
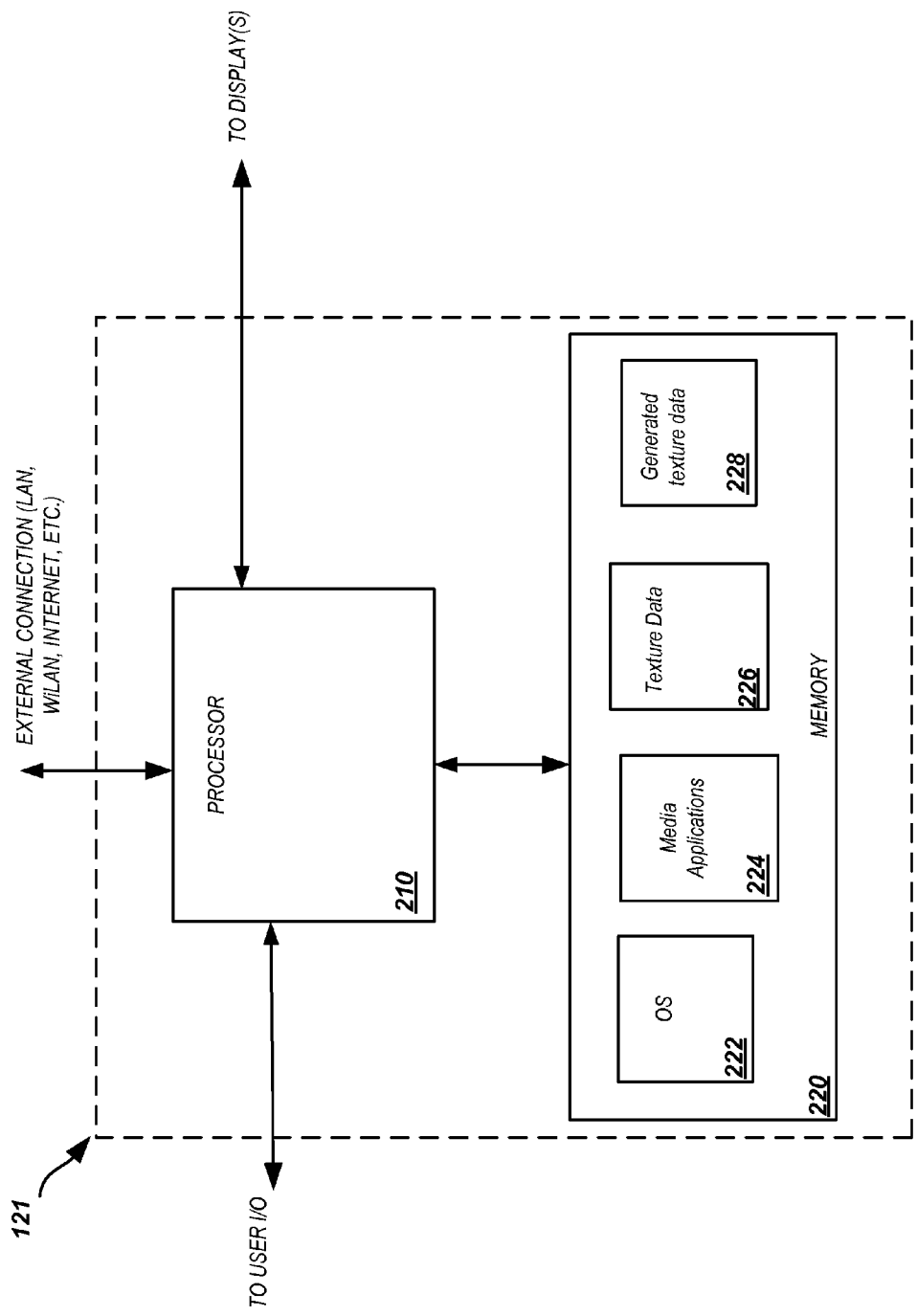
FIG. 2 illustrates a buffer management system.

A high level diagram of an example implementation of the buffer management system 121 is depicted in FIG. 2 as including a processor 210 and memory space 220. Memory space 220 may include one or more physical memory devices, such as DRAM, SRAM, flash, hard disk drives, or other storage devices. Memory space 220 may be configured to store one or more operating systems (OS) 222, one or more media applications 224 (e.g., one or more authoring, composition and/or editing applications), as well as received texture data 226, and store generated texture data 228. The texture data 226 may include data defining the texture, data relating the texture to other textures, data relating the texture to a frame or frames, or other data recognizable by one of skill in the art.

Figure 3A:
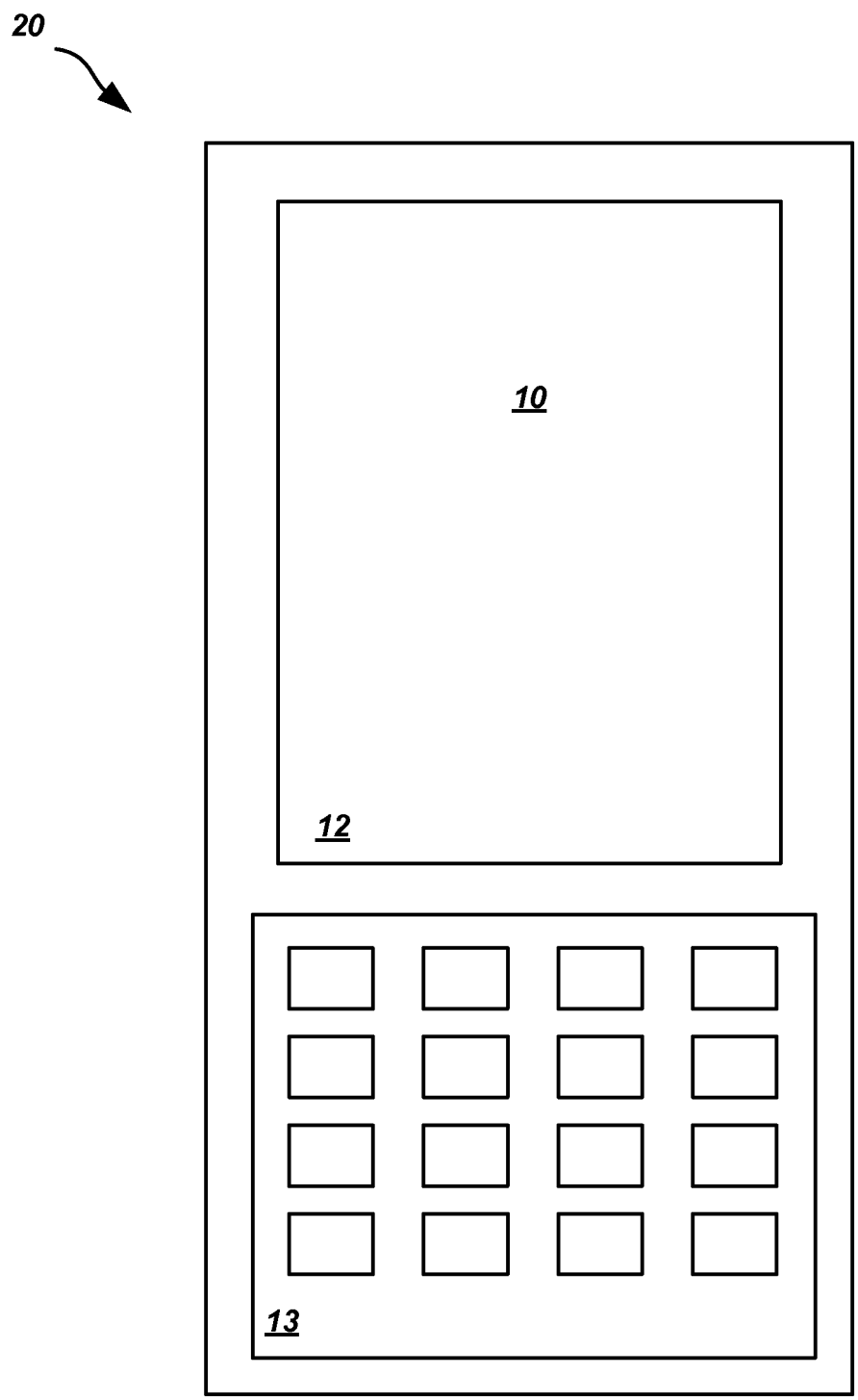
FIG. 3A illustrates a mobile device.

Attention is now directed to FIG. 3A which illustrates a high level diagram of an example mobile device that may include a graphics system that includes the dynamic procedural texture generation management system 100 shown in FIG. 1. Contemporary mobile devices such as shown in FIG. 2A typically include dedicated hardware and software for providing graphics displays. These often include graphics engines including graphics processors to accelerate display performance. Graphics processors and engines are widely used to render 2-dimensional (2-D) and 3-dimensional (3-D) images for presentation on electronic displays, such as on mobile cellular devices or other mobile devices. A graphics processor is a dedicated processor optimized for accelerating graphics. The processor is typically designed specifically to perform floating-point calculations, which are fundamental to 3D graphics rendering. A graphics engine may include a processor coupled with other components such as a frame buffer or other video display circuitry, for performing graphics calculations independently of a computer's main processor. In some device implementations, the graphics engine components may be incorporated with the main processor and/or other processors. Graphics processors may be characterized by the number of pipelines (vertex and fragment shaders), which translate a 3D image characterized by vectors, such as vertices and lines, into a 2D image formed by pixels.

For example, a 3-D image may be modeled with surfaces, and each surface may be approximated with triangles. The number of triangles needed to represent the 3-D image is dependent on the complexity of the surfaces and the desired resolution for the image. The total number of triangles for the 3-D image may be quite large, e.g., in the millions. A typical graphics processor attempts to render the triangles for 3-D images as quickly as possible. Each triangle may be defined by (x, y) coordinates for the three vertices of the triangle. Each vertex of each triangle is associated with various attributes such as color, texture, depth, and so on. The graphics processor may render each triangle by interpolating each of the attributes for that triangle. For each attribute of each triangle, the graphics processor may determine a proper value for that attribute at each pixel location within the triangle. The graphics processor typically achieves this by performing linear interpolation using the values given for the attribute at the three vertices of the triangle. Since a 3-D image may include many triangles and since each triangle may have many attributes, the rendering process is typically very computationally intensive. Moreover, as hardware technology continues to accelerate, new graphics engine are periodically introduced having improved performance capabilities. By way of example, mobile device 20 may be a cellular phone, PDA or other mobile or wireless device. Mobile device 20 typically includes keypads or other user I/O interfaces 13 as well as a display 12, configured to render a scene 10. Scene 10 may be a two dimensional representation of a 3D scene, where elements of the 3D scene are rendered on a flat, two dimension display such as an LCD panel.

Figure 3B:
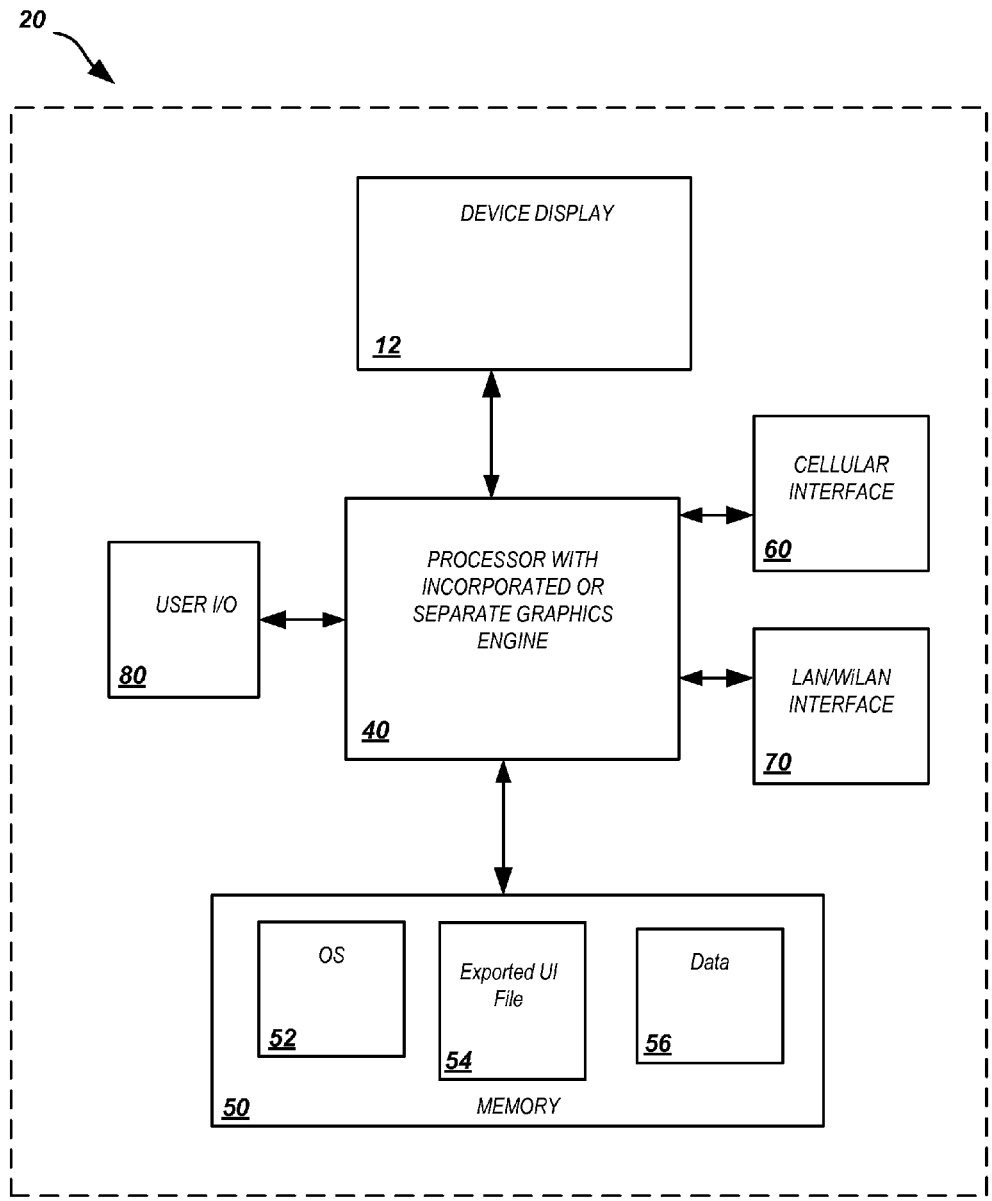
FIG. 3B illustrates additional details of the mobile device of FIG. 2A.

FIG. 3B illustrates additional details of mobile device 20. In particular, mobile device 20 may include one or more processors 40. Processor 40 may be a graphics processor or may be a multi-purpose processor incorporating graphics processor functionality. Processor 40 is coupled to a memory space 50, which may comprise SRAM, DRAM, Flash and/or other physical memory devices. Memory space 50 may be configured to store an operating system (OS) 52, one or more application programs, such as a UI program 52, data 56 associated with the mobile device 20, applications running on processors in the device (e.g., texture data), user information, or other data or content. Mobile device 20 may further include one or more User I/O interfaces 80, such as keypads, touch screen inputs, mice, Bluetooth devices or other I/O devices. In addition, mobile device 20 may include a cellular or other over the air wireless carrier interface 60 as well as a network interface 70, that may be configured to communicate via a LAN or wireless LAN (WiLAN), such as a Wi-Fi network. Other interfaces, such as USB or other wired interfaces (not shown) may also be included.

Application programs, such as UI program 54, may be generated on mobile device 20, or imported or loaded onto the mobile device 20 from the cellular interface 60, network interface 70 or other interfaces.

Figure 4:
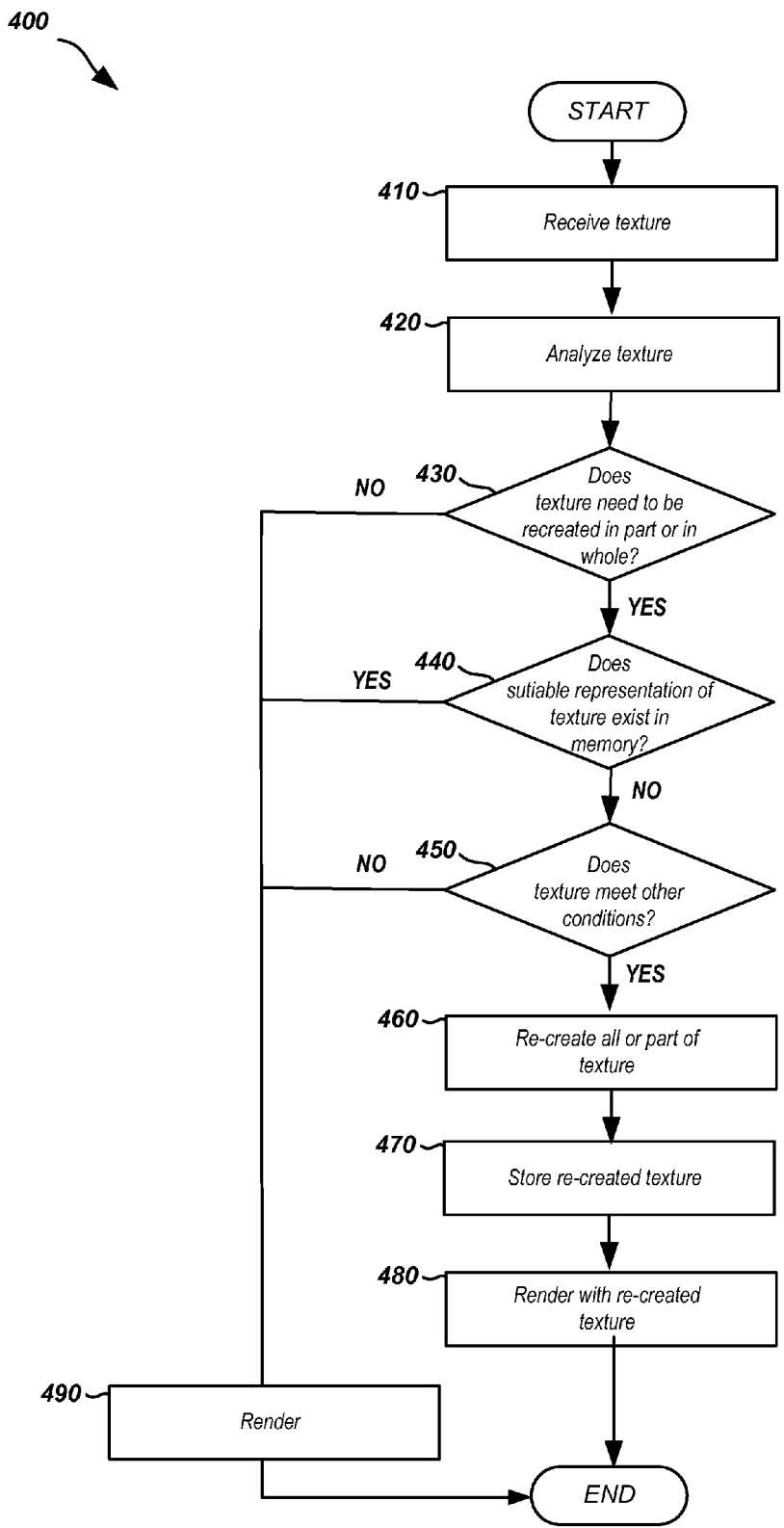
FIGS. 4-7 illustrate various processes for scheduling and storing media creation.

Attention is now drawn to FIG. 4, which illustrates an embodiment of a process 400 for dynamic management of texture generation and storage of generated texture on the buffer management system 121 of FIGS. 1 and 2. At block 410, a texture is received at the processor 210.

Next, at block 420, the processor 210 implements an algorithm to analyze the texture. For example, the algorithm may set forth steps 430-450, which are executed by the processor 210. At step 430, the algorithm may determine whether the texture needs to be recreated in part or in whole. For example, the algorithm may determine that only a visible portion of the texture needs to be recreated, and may make this determination based on the position of the texture in relation to other textures, or based on the position of the texture in relation to the screen size. Next, at step 440, the algorithm may determine whether a suitable representation of the texture exists in memory. Suitability may be measured by resolution or other factors. A suitable representation may include a previously-generated texture from a different frame. Then, at step 450, the algorithm may determine if the texture meets additional conditions. Such additional conditions are understood by one of skill in the art. If the algorithm determines, at any of steps 430-450, that the texture does not need to be recreated, then rendering occurs without any recreated texture at block 490. Otherwise, at block 460, the texture is generated in part or in whole. The generated texture is then stored at block 470. Later, at block 480, the generated texture is loaded from memory, and rendered on a viewing screen.

Figure 5:
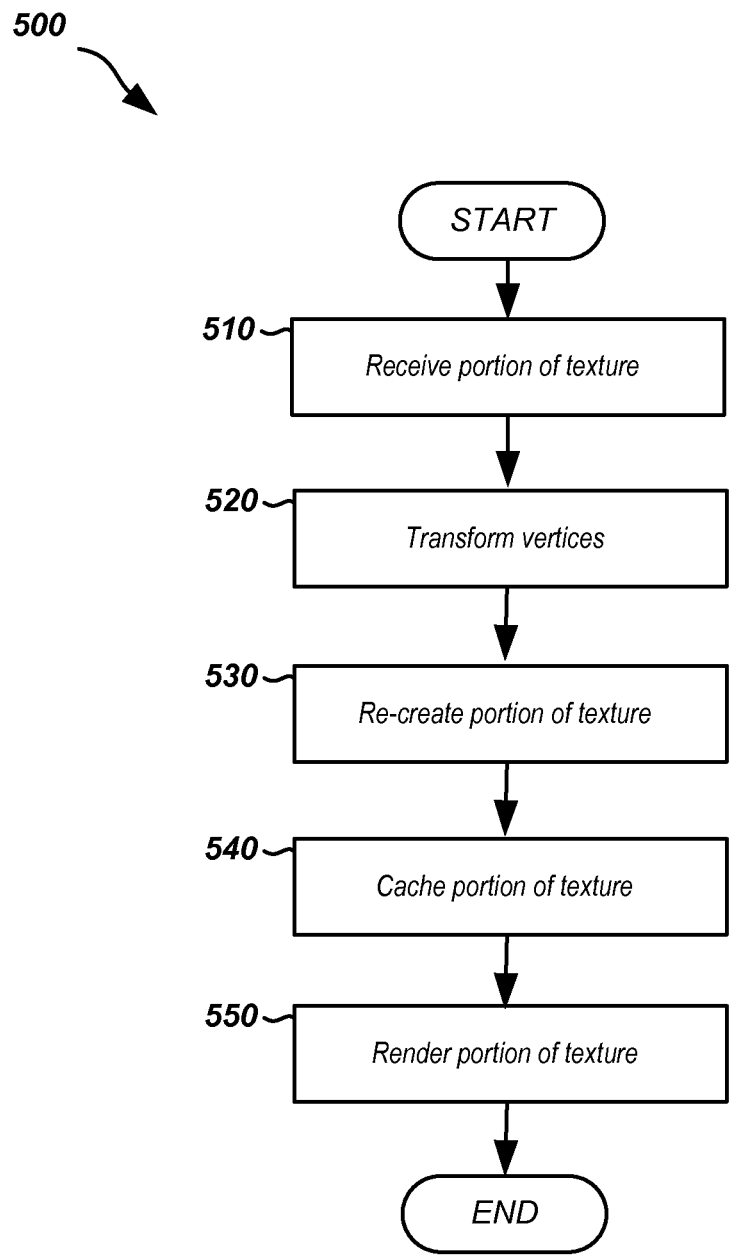

Attention is now directed to FIG. 5, which illustrates details of an embodiment of a process 500 for selectively generating portions of texture and storing those generated portions on the buffer management system 121 of FIGS. 1 and 2. At block 510, a portion of a texture is received at the buffer management system 121. Next, at block 520, vertices of the portion of the texture are transformed. The positions of the vertices can be projected into final rendering screen coordinates in order to compute the exact area and pixel density needed from the texture. The projection may be calculated by using the same process and information used to render the final image.

At block 530, the portion of the texture is generated, and later stored in memory at block 540. Finally, the portion of the texture is rendered on a display at block 550.

Figure 6:
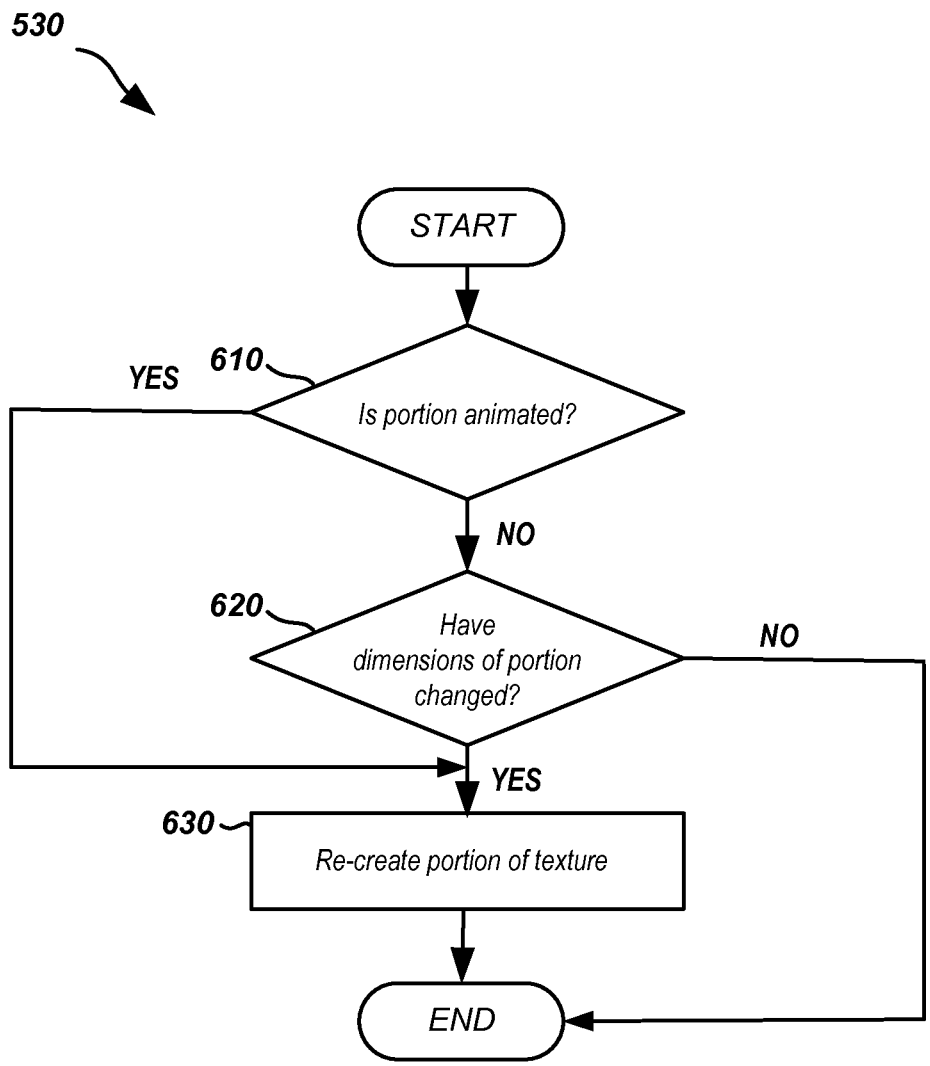

Block 530 is illustrated in FIG. 6. The processor 210 determines whether the portion of the texture is animated at step 610. If the portion of texture is animated, then the portion of the texture is generated at block 630. Otherwise, the processor 210 executes step 620 to determine whether the dimensions of the portion have changed. If the dimensions have changed, then the portion of the texture is generated at block 630. Otherwise, the portion of texture is not generated.

Figure 7:
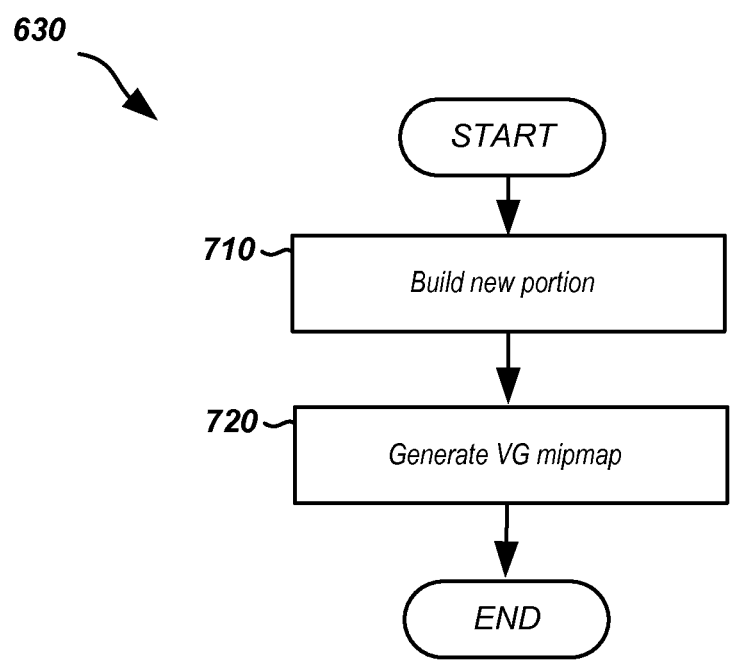

Block 630 is illustrated in FIG. 7. According to FIG. 7, the new portion is built at block 710. Next, at block 720, mipmaps are created based on the newly built portion of the texture. By way of example, the mipmaps may be generated based on vector graphics (VG).

Content generation may be accomplished using any one of various computing environments. One computing environment, for example, may include computer hardware component such as servers, monitors, I/O devices, network connection devices, as well as other associated hardware for on-the-fly clip plane generation of dynamic content. In addition, a computing environment may include one or more application programs configured to receive, convert, process, store, retrieve, transfer and/or export data and other content and information.

Some aspects of the invention relate to parallel or serial processing of different images in anticipation of using those images on a screen. In relation to certain aspects, the required resolution of the images will depend on the size of the screen. Less resolution may be required for smaller screens as compared to a requirement for more resolution for larger screens. Accordingly, certain aspects of the invention process images while considering the size of the screen on which the image displays. For example, an image (or parts of the image like vector objects, etc.) will be stored at a minimum resolution that is necessary for desired viewing of the image on a particular screen size.

Other aspects consider only visible or important parts of images (e.g., visible vector objects, animated vector objects) as compared to non-visible or less-important parts of images. These aspects generate only those visible or important parts of images. For example, only a section of a particular vector object may be visible for a given image on screen of a certain size. These aspects may determine the visible portion of the vector object, and then generate only that visible portion or a small portion of the vector object that includes that visible portion.

Figure 8:
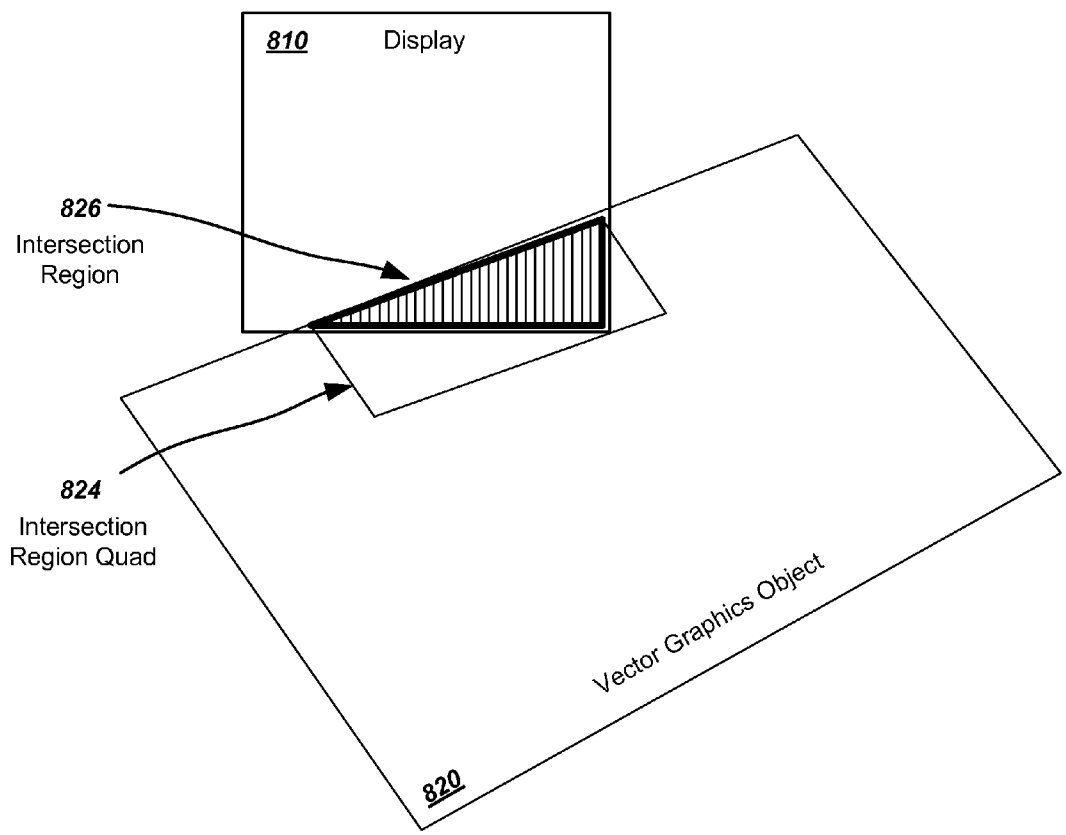
FIG. 8 depicts an intersection region of an object and a display.

Attention is now directed to the figures. FIG. 8 depicts a display 810 and a vector graphics (VG) object 820. As shown, the entire VG object 820 does not appear on the display 810. FIG. 8 further depicts an intersection region 826 that indicates where the VG object appears on the display 810. When rendering the VG object 820, consideration is given to whether only a portion of the VG object 820 appears on the display 820. Rendering the entire VG object 820 is less efficient that rendering only a portion of the VG object 820, such as the portion of the VG object 820 that corresponds to the intersection region 826.

FIG. 8 further depicts an intersection region quad 824. The quad represents the sub-region of the texture that needs to be regenerated and mapped onto the VG object. Images can be generated in rectangular dimensions.

Figure 9:
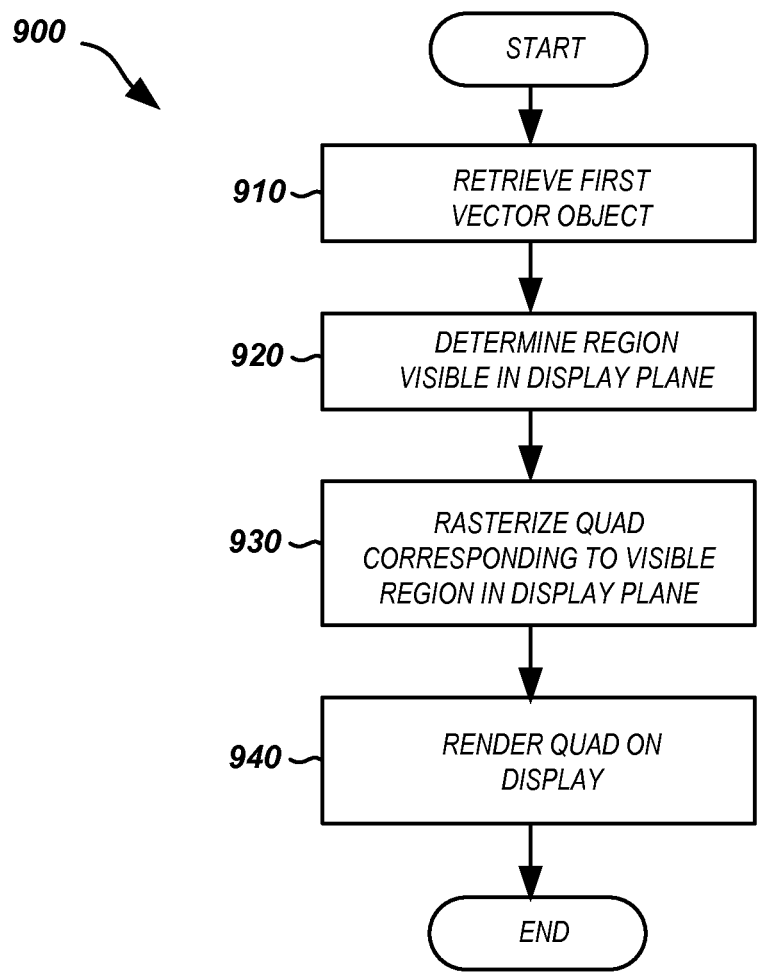
FIG. 9 illustrates a process for on-the-fly clip plane generation for dynamic content.

Attention is now drawn to FIG. 9, which sets forth a process 900 for on-the-fly clip plane generation for dynamic content. At block 910, a first vector object is received. The vector object may, for example, include the vector graphics object 120 of FIG. 8. Next, at block 920, a region of the vector object that is visible in a particular display is determined. The intersection region 126 of FIG. 8 provides one example of a visible region of the VG object 820 in the display 810.

At block 930, a quad corresponding to the visible region in the display is identified and rasterized. FIG. 8 provides one example of a quad 824 that corresponds to a visible region 826 of a VG object 820 in a display 810. Next, at block 940, the quad is rendered on the display.

Figure 10:
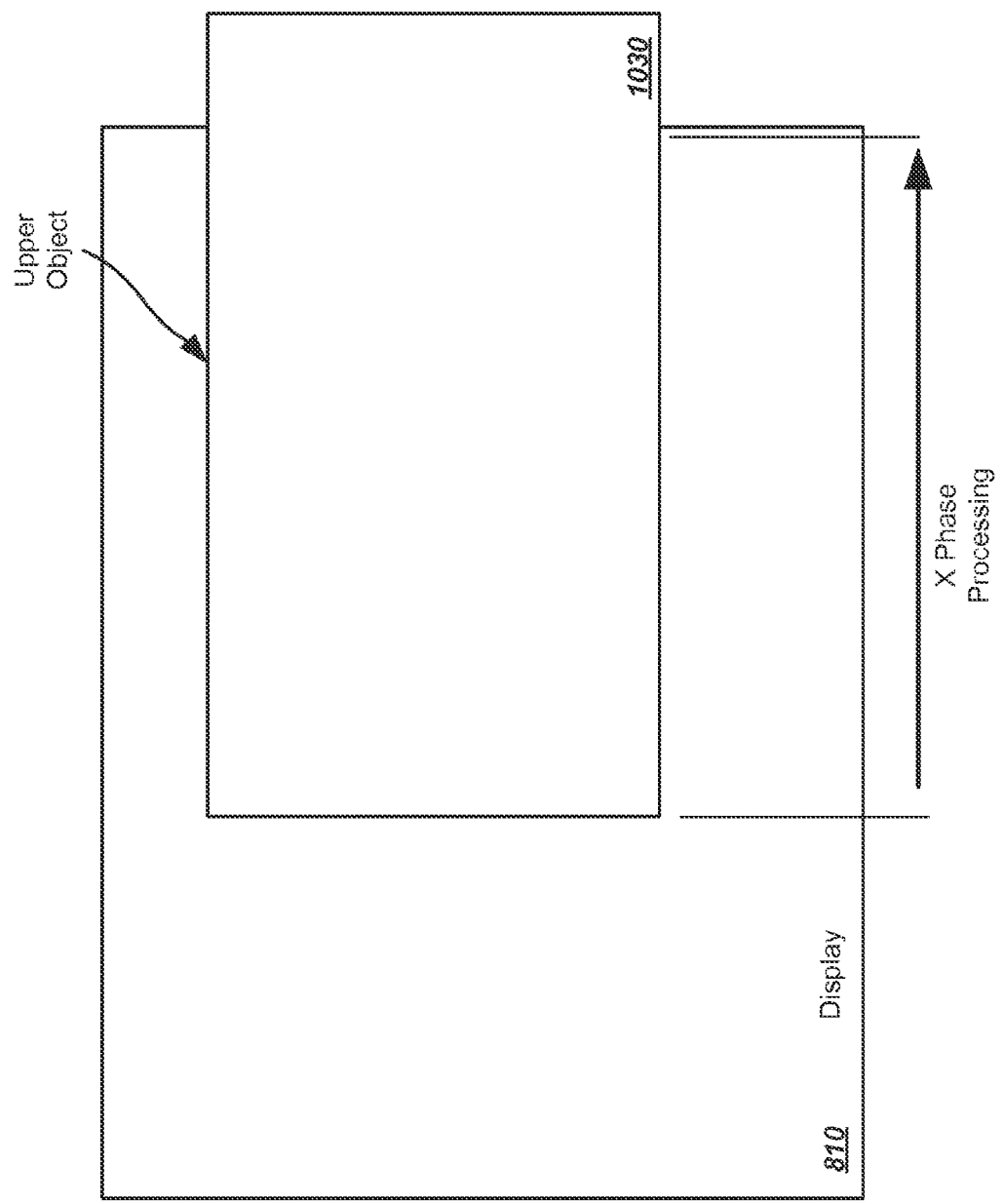
FIG. 10 illustrates broad phase processing of an object.

Attention is now drawn to FIG. 10, which depicts the display 810 and an upper object 1030. As shown, one portion of the vector object 1030 is visible in the display 810, while the other portion is not visible in the display. Broad phase processing is performed on any number of axes to generate a quad for the object 1030. Broad phase processing across a single axis is shown in FIG. 10. Additional broad phase processing may be needed on at least one other axis to define the quad for the object 1030.

The broad phase processing, as shown operates to sort a start, or lower bound, and an end, or upper bound, of the object 1030 along the particular axis (e.g., the x axis). As the object 1030 moves or changes shape, its lower and upper bounds may change. As will be later illustrated in FIG. 11, the object 1030 may move so as to overlap another object (i.e., a lower object 1140 described later), and additional quads are calculated for the other object based on broad phase processing techniques.

The lower and upper bounds of each axis form bounding dimensions. The bounding dimensions for a bounding volume. When volumes formed by bounding dimensions of two objects overlap, additional processing may occur to determine the overlap region and the non-overlap region(s). Such processing is described in relation to FIGS. 11 and 12.

Figure 11:
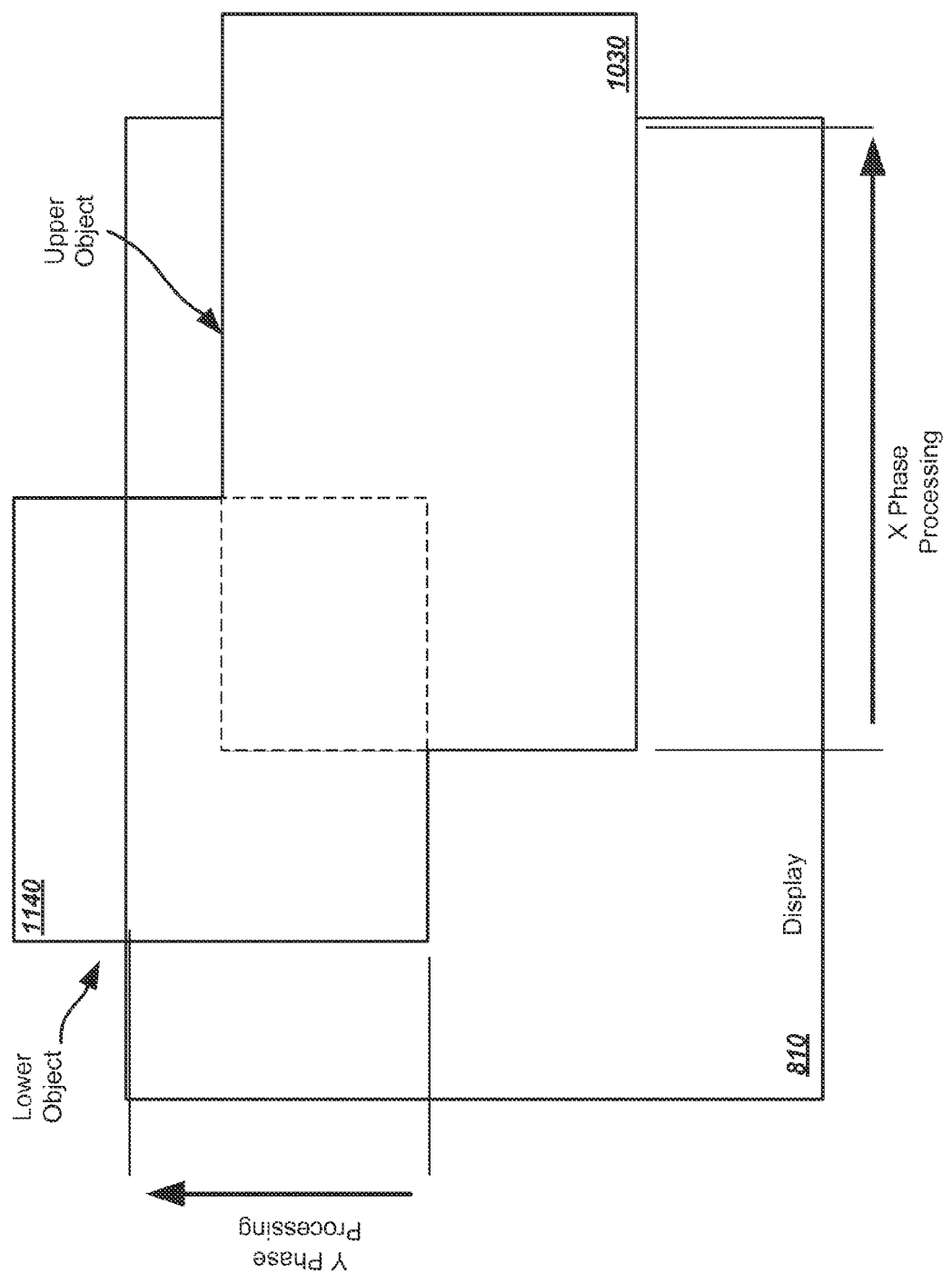
FIG. 11 illustrates broad phase processing of overlapping objects.

Attention is now drawn to FIG. 11, which illustrates that broad phase processing may operate on multiple axes x and y, and on multiple objects 1030 and 1140.

Figure 12:
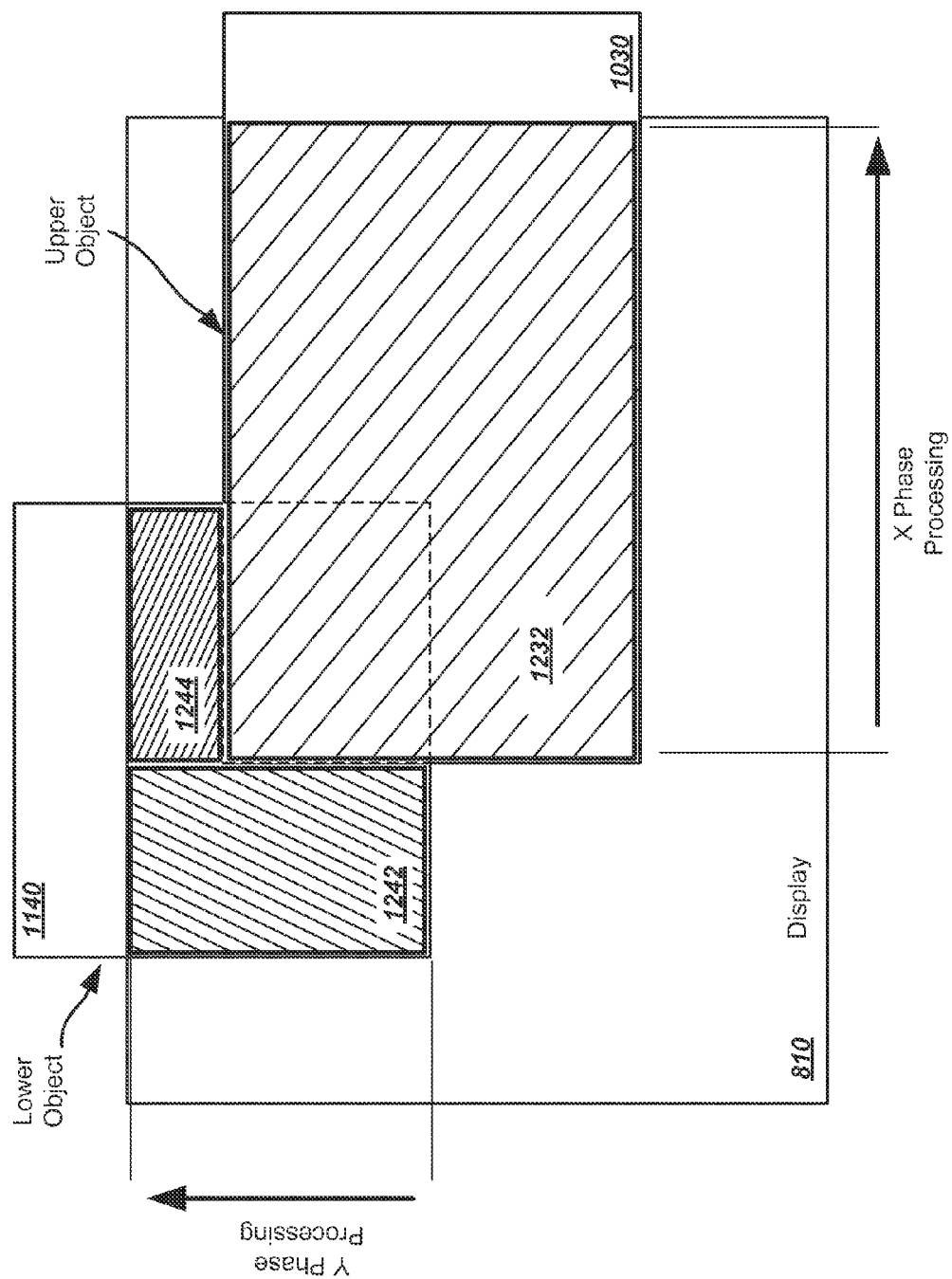
FIG. 12 illustrates broad phase processing of a segmented, overlapped object.

Attention is now drawn to FIG. 12, which depicts an overlapping region where the upper object 1030 overlaps the lower object 1140 in relation to how the display is viewed by a viewer (not shown). As shown, the upper object 1030 is closer to the viewer than the lower object 1140.

FIG. 12 also shows quads 1232, 1242 and 1244. Quad 1232 is representative of the visible portion of the upper object 1030 on the display 810. Quads 1242 and 1244 are representative of the visible portion of the lower object 1140 on the display 810. In order to better use system and processing resources, the lower object 1140 may be segmented into the quads 1242 and 1244. The quads 1242 and 1244 represent the non-overlapped portion of the lower object 1140.

Due to the nature of the shape of a quad like quads 1232, 1242 and 1244, the lower object 1140 may be clipped against quad 1232 so its overlapped portion is not rendered. This significantly reduces fill bits and shader clocks, and therefore reduces power consumption by rendering operations. By using a broad phase test along one or more axes, and generating new quads for non translucent objects, sorting may be accomplished not just on rendering depth but also state changes.

Additional aspects include ordering parts of an image in a hierarchical fashion. For example, two or more vector objects of an image may be ordered based on their relationships to the viewer of the image. A vector object that appears closer to the viewer or in the foreground of an image may be generated before another vector object that appears behind that first vector object or in the background of the image. Rendering may occur via a sorted scene list. Objects may be sorted when they are added or removed, or when they move position in depth. When objects moved to the front or the back of a scene, a ripple sort can be used to reorganize the sorted list. A ripple sort may allow for multiple objects to ripple through the scene in a single iteration allowing for groups of objects to move rather than a single sort element.

By way of another example, two or more vector objects of an image may be ordered based on their relationships to the progression of a story displayed over time by a series of images. A vector object that is moving on the screen over a series of images (i.e., frames) may be generated before a vector object that is not moving on the screen over that series of frames. Alternatively, a vector object that is more critical to the understanding of an image may be generated before another vector object that is less critical to the understanding of the image.

Figure 13:
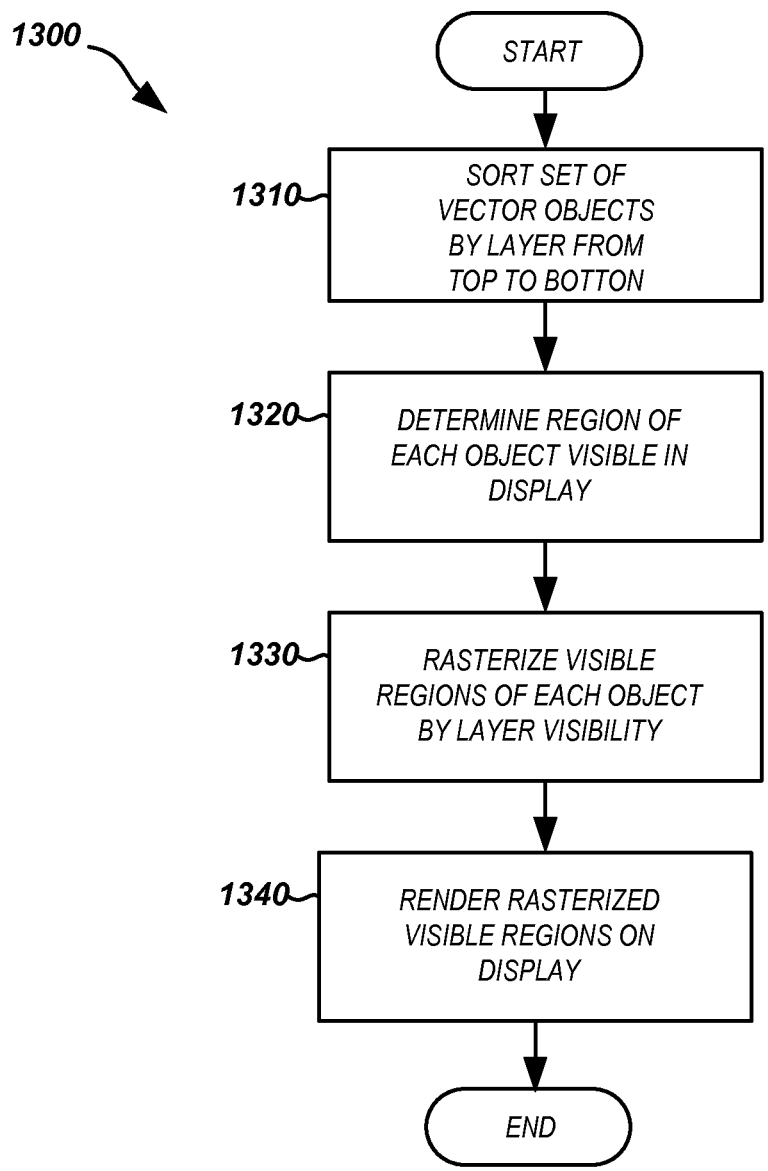
FIG. 13 illustrates a processes for organizing on-the-fly clip plane generation for multiple objects.

Attention is now returned to the figures. FIG. 13 illustrates a process 1300 for on-the-fly clip plane generation for dynamic content. At block 1310, a set of objects are sorted by layer from top to bottom in relation to a viewer looking down into a display, where the top object is the closest visual object to the viewer in relation to 3D images displayed on a 2D display. At block 1320, the regions of each object that are visible on the display are determined. The visible regions are then rasterized in block 1330. Next, in block 1340, the rasterized visible regions are rendered on the display.

Figure 14:
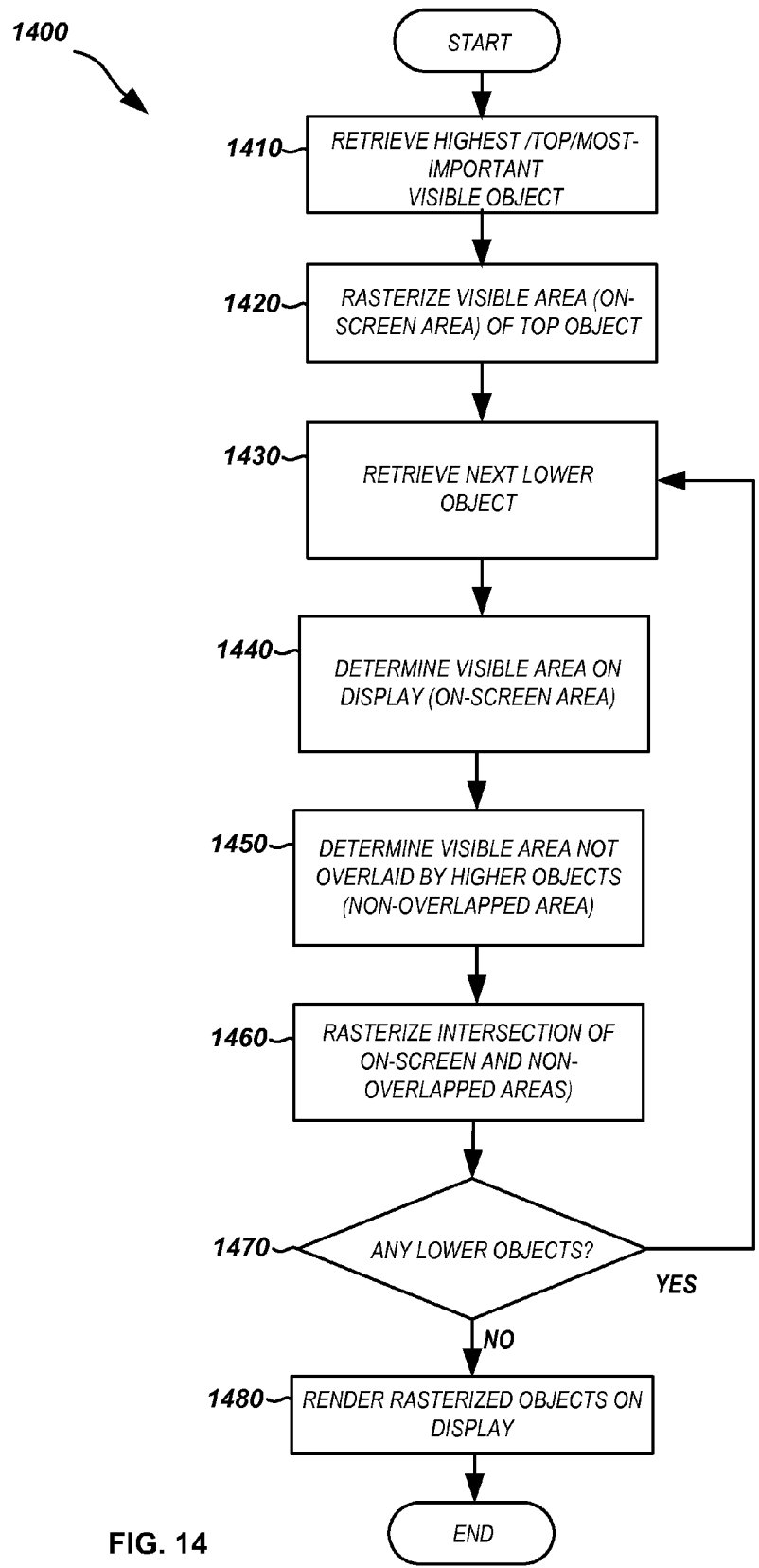
FIG. 14 illustrates a processes for ordering objects prior to rendering operations.

FIG. 14 illustrates a process 1400 for processing an order of objects during on-the-fly clip plane generation. At block 1410, an object with the highest priority ranking is retrieved. Priority rankings may be assigned using different considerations. For example, priority rankings may be base on proximity of the object to the viewer in relation to other objects. An object that appears closer to the viewer may receive a higher ranking than another object that appears farther away from the viewer. Alternatively, the priority ranking may be based on an objects importance. An object that is critical to the enjoyment or understanding of an image may receive a higher ranking than another object that is less critical.

At block 1420, the visible area (i.e., the on-screen area) of the highest priority object is rasterized. Next, at block 1430, the next lower object in the priority ranking of objects is retrieved. Then, at block 1440, the visible area of that object is determined. Once the visible area for that object is determined, the visible area of that object that is not overlapped by other, higher-ranked objects is determined at block 1450. This non-overlapped, visible area is rasterized at block 1460.

If, at step 1470, additional lower-ranked objects are identified, blocks 1430-760 are repeated for those lower-ranked objects. If, at step 1470, no additional lower-ranked objects are identified, then the objects that have been rasterized will be rendered on the display at block 1480.

Figure 15:
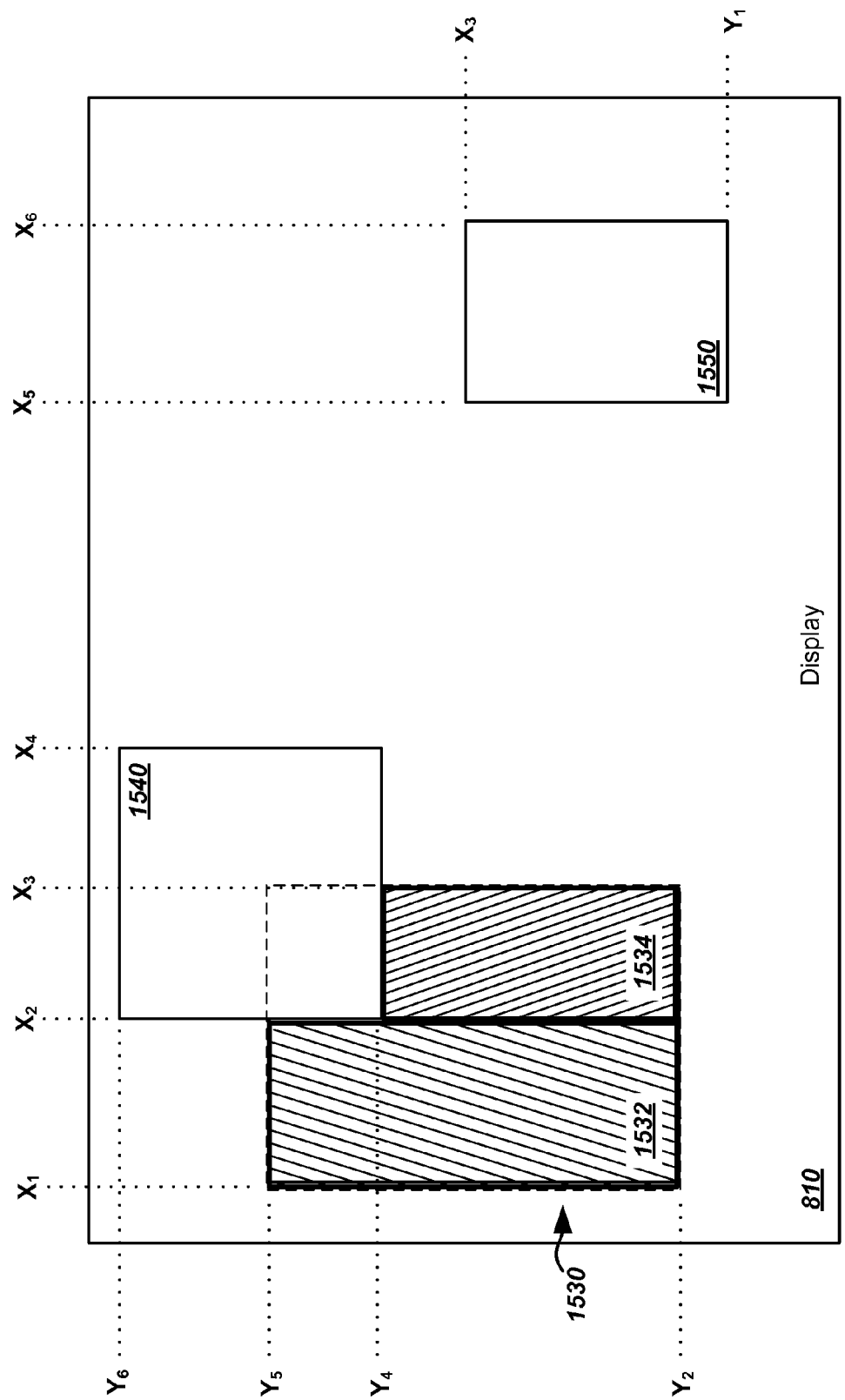
FIG. 15 illustrates broad phase processing of multiple objects.

Attention is now turned to FIG. 15, which depicts the display 810 and three objects. The three objects include object 1530, 1540 and 1550. The object 1530 overlaps the object 1540. The object 1550 neither overlaps another object, nor is it overlapped by another object. As shown in FIG. 15, various broad phase processing coordinates are provided on the x and y axes. Coordinates $X_2$ and $X_4$, and $Y_4$ and $Y_6$ define the quad 1532, which happens to include all of the object 1530. Coordinates $X_1$ and $X_2$, and $Y_2$ and $Y_5$ define the quad 1542, which includes a portion of non-overlapping part of the object 1540. Coordinates $X_2$ and $X_3$, and $Y_2$ and $Y_4$ define the quad 1544, which includes the other portion of the non-overlapping part of the object 1540. Coordinates $X_5$ and $X_6$, and $Y_1$ and $Y_3$ define the quad 1552, which happens to include all of the object 1550.

Some of the various aspects of the invention describe a methods, systems and computer programs for scheduling and caching media creation in such a way that the latency for the full composition is decoupled from the individual costs of generation for each media source. Certain methods, systems and computer programs may employ hardware configurations where parallel computation resources are available for graphics processing (GPU) and vector SIMD processing. Broadly, certain aspects described have access to all the interaction possibilities and media requirements that can be displayed through a composition system. This information may be gathered through a pre-processing step in an authoring environment in which the requirements for a final image are specified. As the composition system is tasked to create the next frame to be displayed, the upcoming media requirements may be analyzed and scheduled via a buffer management system. A current buffer of the media may be dynamically created via a stream processing system, and loaded on hardware resources such as a GPU or co-processor. In order to limit the load to only the data that needs to be recreated, the scheduling system may employ a multi-layered caching algorithm to identify regions of screen in both composition space and screen space and then operate only the areas necessary for update.

Certain aspects of the invention may utilize scene-specific knowledge to determine the media requirements for what is required on-screen at a certain point in time, and may then limit processing to only those areas via a scheduling and caching system that balances overall composition load across multiple computational units. These and other aspects of the invention may be embodied in a client device 1600 of FIG. 16.

Figure 16:
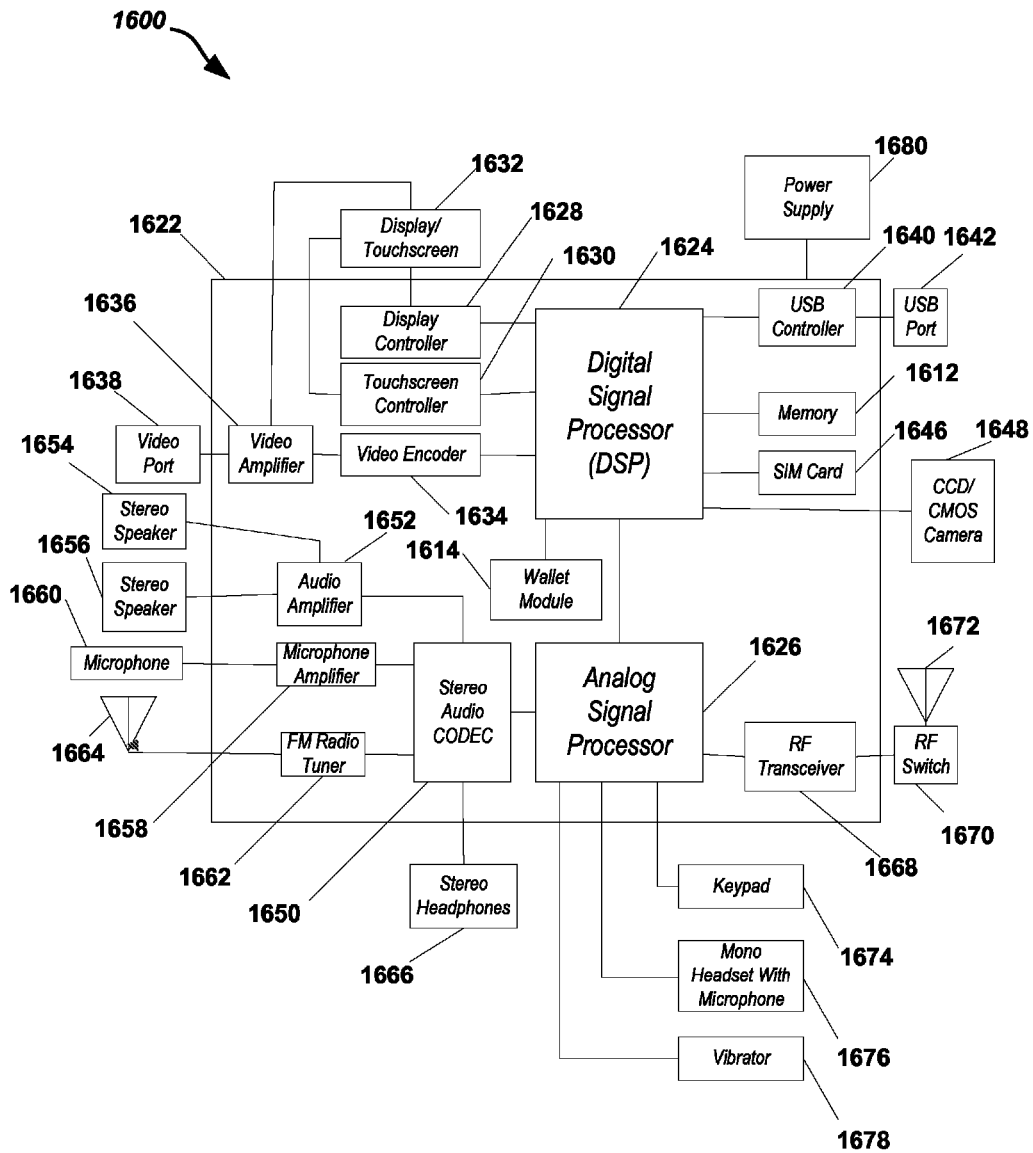
FIG. 16 illustrates an exemplary client device that comprises a mobile telephone.

Referring now to FIG. 16, this figure illustrates an exemplary, non-limiting aspect of a client device 1600 comprising a wireless telephone which may correspond with FIGS. 1-15. As shown, the client device 1600 includes an on-chip system 1622 that includes a digital signal processor 1624 and an analog signal processor 1626 that are coupled together. As illustrated in FIG. 16, a display controller 1628 and a touch screen controller 1630 are coupled to the digital signal processor 1624. A touch screen display 1632 external to the on-chip system 1622 is coupled to the display controller 1628 and the touch screen controller 1630.

FIG. 16 further indicates that a video encoder 1634, e.g., a phase-alternating line ("PAL") encoder, a sequential couleur avec memoire ("SECAM") encoder, a national television system(s) committee ("NTSC") encoder or any other video encoder, is coupled to the digital signal processor 1624. Further, a video amplifier 1636 is coupled to the video encoder 1634 and the touch screen display 1632. A video port 1638 is coupled to the video amplifier 1636. As depicted in FIG. 16, a universal serial bus ("USB") controller 1640 is coupled to the digital signal processor 1624. Also, a USB port 1642 is coupled to the USB controller 1640. A memory 1612 and a subscriber identity module ("SIM") card 1646 may also be coupled to the digital signal processor 1624. Further, as shown in FIG. 16, a digital camera 1648 may be coupled to the digital signal processor 1624. In an exemplary aspect, the digital camera 1648 is a charge-coupled device ("CCD") camera or a complementary metal-oxide semiconductor ("CMOS") camera.

As further illustrated in FIG. 16, a stereo audio CODEC 1650 may be coupled to the analog signal processor 1626. Moreover, an audio amplifier 1652 may be coupled to the stereo audio CODEC 1650. In an exemplary aspect, a first stereo speaker 1654 and a second stereo speaker 1656 are coupled to the audio amplifier 1652. FIG. 16 shows that a microphone amplifier 1658 may be also coupled to the stereo audio CODEC 1650. Additionally, a microphone 1660 may be coupled to the microphone amplifier 1658. In a particular aspect, a frequency modulation ("FM") radio tuner 1662 may be coupled to the stereo audio CODEC 1650. Also, an FM antenna 1664 is coupled to the FM radio tuner 1662. Further, stereo headphones 1666 may be coupled to the stereo audio CODEC 1650.

FIG. 16 further indicates that a radio frequency ("RF") transceiver 1668 may be coupled to the analog signal processor 1626. An RF switch 1670 may be coupled to the RF transceiver 1668 and an RF antenna 1672. The RF transceiver 1668 may communicate with mobile telephone networks as well as satellites to receive global positioning system ("GPS") signals. As shown in FIG. 16, a keypad 1674 may be coupled to the analog signal processor 1626. Also, a mono headset with a microphone 1676 may be coupled to the analog signal processor 1626. Further, a vibrator device 1678 may be coupled to the analog signal processor 1626. FIG. 16 also shows that a power supply 1680 may be coupled to the on-chip system 1622. In a particular aspect, the power supply 1680 is a direct current ("DC") power supply that provides power to the various components of the client device 1602 that require power. Further, in a particular aspect, the power supply is a rechargeable DC battery or a DC power supply that is derived from an alternating current ("AC") to DC transformer that is connected to an AC power source.

FIG. 16 also shows that the client device 1600 may include a wallet module 1614. The wallet module 1614 may communicate with the client device management server 1606 to update wallet information stored in the client device 1602. As depicted in FIG. 16, the touch screen display 1632, the video port 1638, the USB port 1642, the camera 1648, the first stereo speaker 1654, the second stereo speaker 1656, the microphone 1660, the FM antenna 1664, the stereo headphones 1666, the RF switch 1670, the RF antenna 1672, the keypad 1674, the mono headset 1676, the vibrator 1678, and the power supply 1680 are external to the on-chip system 1622.

In a particular aspect, one or more of the method steps and blocks described herein may be stored in the memory 1612 as computer program instructions. These instructions may be executed by the digital signal processor 1624, the analog signal processor 1626, or another processor, to perform the methods described herein. Further, the processors, 1624, 1626, the memory 1612, the instructions stored therein, or a combination thereof may serve as a means for performing one or more of the method steps described herein.

Some aspects of the present invention may be used in relation to standards, multi-media platforms, file formats, video game engines and other equivalents. For example, content authored and displayed in relation to any or all of the various aspects of the present invention may relate to HTML 5, Flash, Scalable Vector Graphics (SVG), video game engines (e.g., Quake, Unreal, etc.) and any other equivalents.

Other aspects relate pixel perfect images that require screen space coordinates that can be used to compute a vector graphics (VG) texture. Projected Geometry will normally distort from the rectangular image to a trapezoid, or at least it will change in resolution from its source size to either a reduced or higher resolution. Conventional systems normally rely on mipmapping to handle image changes in a view space to solve for pixilation. However this requires some form of streaming for large textures that may take up most of the viewport. Certain aspects of the invention, like the generation of pixel perfect images, overcome the convention shortcomings.

When generating pixel perfect images, a multi-process architecture may be used to offload rendering and render-related operations as individual tasks that are consumed as they are received. The architecture may be configured to handle out of order computation. For example, when scheduling two VG textures to render where one texture is large and complex and the other texture is smaller, the smaller texture preempts the larger one in order of processing. Since the smaller texture cannot 'stall' the processing if it is processed first.

Additional aspects relate to processing VG textures. A processor may process requests for re-rendering textures. If a VG texture, for example, is used for multiple textures and the source is within a mip level tolerance, then the processor will not re-render the texture. However, if a higher resolution is needed, the processor will re-render the texture. A software renderer may be used to render textures. Alternatively, an OpenVG renderer may be used if it is supported in hardware.

An addition aspect relates to mipmaps. If software decides to create a new mipmap at the top most level, the software can decide to create a mipmap based on a rendered VG texture as opposed to using a Bilinear or Gaussian approximation. Additional image quality is gained by using the rendered VG texture.

Another aspect relates to caching of VG textures. Memory may be allocated to a particular VG textures until that VG texture is no longer needed or until more important VG textures are needed. Texture "dictionaries" may be generated from the cache when rendering 'like' data to reduce the state changes in the renderer.

In the previous example embodiments, small numbers of textures are shown in the various examples for purposes of clarity. Nevertheless, in various implementations, large numbers of textures may be advantageously be processed in a serial fashion, a parallel fashion or a combination of serial and parallel fashions, in the system 100, the system 121, or other similar or equivalent systems, as described previously herein.

Certain aspects of the invention relate to a procedural texture system that utilizes parallel resources to create texture assets just-in-time for use on a screen. Unlike traditional 3D pipelines where multiple resolutions of textures are kept on a server or on attached media, the highest resolution texture required for rendering any asset is the screen size of a device. This constant requirement means that only textures on screen are resident in memory. A screen-space/world-space clip plane generator for assets that have procedural generators associated with them may be used. Once calculated, a clip matrix may be used to ensure that parallel processing only renders parts of the screen that are visible. Several optimization layers and load-balancing features may be employed to ensure compatible with various hardware capabilities.

Another aspect of the invention relates to rebuilding geometry only when the geometry moves or is animating.

Other aspects of the invention relate to quad groups, which are collections of quads with similar properties. A group can be cached as a single texture. An example of a quad group would be a 9-patch SVG texture used for a panel. If any component in a group changes, the group would rebuilt. Quad groups may have similar rendering properties. For instance it may not be possible to mix shaders or effects due to the way a cached texture built from a quad group would render. The benefits, however, from a UI perspective is that complex images can be built without the continual overhead of a per-quad rendering process.

Additional aspects of the invention relate to material updaters. Some materials may require dynamic width and height updates from a projected quad size on the screen. Flash and SVG containers, for example, fall into this category where the resolution of the on-screen image can be used to generate a dynamic texture at an appropriate size. Other materials can result from animations or even rendered updates from a 3D scene. Material updaters tie into a streaming texture component of a Media Center Extender for automatic updates. Computer and video game images may need to be generated based on projected screen space information, which may require software-transforming of vertices. Because a material can be referenced by multiple objects, this may require a scheduler/instance handler for each assigned object.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps in the processes disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. It is intended that the following claims and their equivalents define the scope of the invention.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

It is intended that the following claims and their equivalents define the scope of the invention.

We claim:

1. A computer-implemented method for dynamic procedural texture generation management in a hardware accelerated graphics application, the method comprising:
   receiving a texture for use in a first frame;
   determining whether the texture needs to be recreated in part or in whole;
   creating just-in-time, based on a determination that the texture needs to be recreated, a first generated texture based on the texture, wherein creating the first generated texture comprises:
   receiving a portion of the texture; and
   transforming vertices of the portion of the texture by projecting positions of the vertices into final rendering screen coordinates; and
   storing the first generated texture in a memory.

2. The method of claim 1, further comprising:
   retrieving the stored, first generated texture; and
   rendering the stored first generated texture in the first frame.

3. The method of claim 1, wherein the determining further comprises:
   determining that the texture needs to be recreated when the texture is an animated texture.

4. The method of claim 1, wherein the determining further comprises:
   determining that the texture needs to be recreated based on the dimensions of the texture.

5. The method of claim 1, wherein the determining comprises:
   determining that the texture needs to be recreated because no suitable, previously-generated representation of the texture is stored in the memory.

6. The method of claim 1, wherein the first generated texture is a vector graphic texture, said method further comprising:
   creating one or more mipmaps based on the first generated texture.

7. The method of claim 1, further comprising:
   receiving, simultaneously with the receiving the texture for use in the first frame, a second texture for use in the first frame;
   determining, simultaneously with the determining whether the texture needs to be recreated, whether the second texture needs to be recreated;
   creating just-in-time, simultaneously with the creating a first generated texture, a second generated texture based on the second texture and based on a determination that the second texture needs to be recreated; and
   storing the second generated texture in the memory.

8. The method of claim 2, wherein rendering the first frame further comprises:
   determining a first intersection region of a first vector graphics object and a display plane;
   determining a quad encompassing the first intersection region; and
   rasterizing the quad.

9. The method of claim 8, the method further comprising:
   rendering the rasterized quad on a display of a device.

10. The method of claim 9, wherein the display defines the display plane.

11. The method of claim 10, wherein the device is a cellular phone.

12. The method of claim 8, the method further comprising:
- determining a second intersection region of a second vector graphics object and the display plane;
- determining a second quad encompassing the second intersection region;
- comparing the first and second quad to determine an overlap region; and
- rasterizing, based on the determined overlap region, a portion of the second quad.

13. The method of claim 12, wherein the portion of the second quad is outside of the first intersection region.

14. The method of claim 2, further comprising:
- determining a set of sorted objects by sorting the objects based on a layering from top to bottom;
- determining an on-screen area of the top object of the sorted objects;
- rasterizing the on-screen area of the top object;
- retrieving the next lower object from the set of sorted objects;
- determining an on-screen area of the next lower object;
- determining a non-overlapped area of the on-screen area;
- rasterizing the non-overlapped area; and
- rendering the rasterized non-overlapped area.

15. A computer system for dynamic procedural texture generation management in a hardware accelerated graphics application, the system comprising:
- a processor; and
- a memory coupled to the processor,
- wherein the processor is configured with processor-executable instructions to perform operations comprising:
  - receiving a texture for use in a first frame;
  - determining whether the texture needs to be recreated in part or in whole;
  - creating just-in-time, based on a determination that the texture needs to be recreated, a first generated texture based on the texture, wherein creating the first generated texture comprises:
    - receiving a portion of the texture; and
    - transforming vertices of the portion of the texture by projecting positions of the vertices into final rendering screen coordinates; and
  - storing the first generated texture in the memory.

16. The computer system of claim 15, wherein the processor is configured with processor-executable instructions to perform operations further comprising:
- retrieving the stored, first generated texture; and
- rendering the stored first generated texture in the first frame.

17. The computer system of claim 15, wherein the processor is configured with processor-executable instructions to perform operations further comprising:
- determining that the texture needs to be recreated based on the dimensions of the texture.

18. The computer system of claim 15, wherein the processor is configured with processor-executable instructions to perform operations further comprising:
- determining that the texture needs to be recreated based on the dimensions of the texture.

19. The computer system of claim 15, wherein the processor is configured with processor-executable instructions to perform operations further comprising:
- determining that the texture needs to be recreated because no suitable, previously-generated representation of the texture is stored in the memory.

20. The computer system of claim 15, wherein the first generated texture is a vector graphic texture, and wherein the processor is configured with processor-executable instructions to perform operations further comprising:
- creating one or more mipmaps based on the first generated texture.

21. The computer system of claim 15, wherein the processor is configured with processor-executable instructions to perform operations further comprising:
- receiving, simultaneously with the receiving the texture for use in the first frame, a second texture for use in the first frame;
- determining, simultaneously with the determining whether the texture needs to be recreated, whether the second texture needs to be recreated;
- creating just-in-time, simultaneously with the creating a first generated texture, a second generated texture based on the second texture and based on a determination that the second texture needs to be recreated; and
- storing the second generated texture in the memory.

22. The computer system of claim 16, wherein the processor is configured with processor-executable instructions to perform operations such that rendering the first frame further comprises:
- determining a first intersection region of a first vector graphics object and a display plane;
- determining a quad encompassing the first intersection region; and
- rasterizing the quad.

23. The computer system of claim 22, wherein the processor is configured with processor-executable instructions to perform operations further comprising:
- rendering the rasterized quad on a display of a device.

24. The computer system of claim 23, wherein the display defines the display plane.

25. The computer system of claim 24, wherein the device is a cellular phone.

26. The computer system of claim 22, wherein the processor is configured with processor-executable instructions to perform operations further comprising:
- determining a second intersection region of a second vector graphics object and the display plane;
- determining a second quad encompassing the second intersection region;
- comparing the first and second quad to determine an overlap region; and
- rasterizing, based on the determined overlap region, a portion of the second quad.

27. The computer system of claim 26, wherein the portion of the second quad is outside of the first intersection region.

28. A computer system for dynamic procedural texture generation management in a hardware accelerated graphics application, the system comprising:
- means for receiving a texture for use in a first frame;
- means for determining whether the texture needs to be recreated in part or in whole;
- means for creating just-in-time, based on a determination that the texture needs to be recreated, a first generated texture based on the texture, wherein means for creating the first generated texture comprises:
  - means for receiving a portion of the texture; and
  - means for transforming vertices of the portion of the texture by projecting positions of the vertices into final rendering screen coordinates; and
- means for storing the first generated texture in a memory.

29. The computer system of claim 28, wherein the system further comprises:
means for retrieving the stored, first generated texture; and
means for rendering the stored first generated texture in the first frame.

30. The computer system of claim 28, wherein the system further comprises:
means for determining that the texture needs to be recreated when the texture is an animated texture.

31. The computer system of claim 28, wherein the system further comprises:
means for determining that the texture needs to be recreated based on the dimensions of the texture.

32. The computer system of claim 28, wherein the system further comprises:
means for determining that the texture needs to be recreated because no suitable, previously-generated representation of the texture is stored in the memory.

33. The computer system of claim 28, wherein the first generated texture is a vector graphic texture, and wherein the system further comprises:
means for creating one or more mipmaps based on the first generated texture.

34. The computer system of claim 28, wherein the system further comprises:
means for receiving, simultaneously with the receiving the texture for use in the first frame, a second texture for use in the first frame;
means for determining, simultaneously with the determining whether the texture needs to be recreated, whether the second texture needs to be recreated;
means for creating just-in-time, simultaneously with the creating a first generated texture, a second generated texture based on the second texture and based on a determination that the second texture needs to be recreated; and
means for storing the second generated texture in the memory.

35. The computer system of claim 29, wherein means for rendering further comprises:
means for determining a first intersection region of a first vector graphics object and a display plane;
means for determining a quad encompassing the first intersection region; and
means for rasterizing the quad.

36. The computer system of claim 35, the system further comprising:
means for rendering the rasterized quad on a display of a device.

37. The computer system of claim 36, wherein the display defines the display plane.

38. The computer system of claim 37, wherein the device is a cellular phone.

39. The computer system of claim 35, the system further comprising:
means for determining a second intersection region of a second vector graphics object and the display plane;
means for determining a second quad encompassing the second intersection region;
means for comparing the first and second quad to determine an overlap region; and
means for rasterizing, based on the determined overlap region, a portion of the second quad.

40. The computer system of claim 39, wherein the portion of the second quad is outside of the first intersection region.

41. The system of claim 29, further comprising:
means for determining a set of sorted objects by sorting the objects based on a layering from top to bottom;
means for determining an on-screen area of the top object of the sorted objects;
means for rasterizing the on-screen area of the top object;
means for retrieving the next lower object from the set of sorted objects;
means for determining an on-screen area of the next lower object;
means for determining a non-overlapped area of the on-screen area;
means for rasterizing the non-overlapped area; and
means for rendering the rasterized non-overlapped area.

42. A non-transitory computer-readable storage medium having stored thereon computer-executable instructions configured to cause a processor to perform operations for dynamic procedural texture generation management in a hardware accelerated graphics application comprising:
receiving a texture for use in a first frame;
determining whether the texture needs to be recreated in part or in whole;
creating just-in-time, based on a determination that the texture needs to be recreated, a first generated texture based on the first texture, wherein creating the first generated texture comprises:
receiving a portion of the texture; and
transforming vertices of the portion of the texture by projecting positions of the vertices into final rendering screen coordinates; and
storing the first generated texture in a memory.

43. The non-transitory computer-readable storage medium of claim 42, wherein the stored computer-executable instructions are configured to cause the processor to perform operations further comprising:
retrieving the stored, first generated texture; and
rendering the stored first generated texture in the first frame.

44. The non-transitory computer-readable storage medium of claim 42, wherein the stored computer-executable instructions are configured to cause the processor to perform operations further comprising:
determining that the texture needs to be recreated when the texture is an animated texture.

45. The non-transitory computer-readable storage medium of claim 42, wherein the stored computer-executable instructions are configured to cause the processor to perform operations further comprising:
determining that the texture needs to be recreated based on the dimensions of the texture.

46. The non-transitory computer-readable storage medium of claim 42, wherein the stored computer-executable instructions are configured to cause the processor to perform operations further comprising:
determining that the texture needs to be recreated because no suitable, previously-generated representation of the texture is stored in the storage.

47. The non-transitory computer-readable storage medium of claim 42, wherein the first generated texture is a vector graphic texture, and wherein said stored computer-executable instructions are configured to cause the processor to perform operations further comprising:
creating one or more mipmaps based on the first generated texture.

48. The non-transitory computer-readable storage medium of claim 42, wherein the stored computer-executable instructions are configured to cause the processor to perform operations further comprising:
receiving, simultaneously with the receiving the texture for use in the first frame, a second texture for use in the first frame;
determining, simultaneously with the determining whether the texture needs to be recreated, whether the second texture needs to be recreated;
creating just-in-time, simultaneously with the creating a first generated texture, a second generated texture based on the second texture and based on a determination that the second texture needs to be recreated; and
storing the second generated texture in the memory.

49. The non-transitory computer-readable storage medium of claim 43, wherein the stored computer-executable instructions are configured to cause the processor to perform operations such that rendering the first frame further comprises:
determining a first intersection region of a first vector graphics object and a display plane;
determining a quad encompassing the first intersection region; and
rasterizing the quad.

50. The non-transitory computer-readable storage medium of claim 49, wherein the stored computer-executable instructions are configured to cause the processor to perform operations further comprising:
rendering the rasterized quad on a display of a device.

51. The non-transitory computer-readable storage medium of claim 50, wherein the display defines the display plane.

52. The non-transitory computer-readable storage medium of claim 51, wherein the device is a cellular phone.

53. The non-transitory computer-readable storage medium of claim 49, wherein the stored computer-executable instructions are configured to cause the processor to perform operations further comprising:
determining a second intersection region of a second vector graphics object and the display plane;
determining a second quad encompassing the second intersection region;
comparing the first and second quad to determine an overlap region; and
rasterizing, based on the determined overlap region, a portion of the second quad.

54. The non-transitory computer-readable storage medium of claim 53, wherein the portion of the second quad is outside of the first intersection region.

55. A non-transitory computer-readable storage medium having stored thereon computer-executable instructions configured to cause a processor to perform operations for dynamic procedural texture generation management in a hardware accelerated graphics application comprising:
receiving a texture for use in a first frame;
determining whether the texture needs to be recreated in part or in whole;
creating just-in-time, based on a determination that the texture needs to be recreated, a first generated texture based on the first texture, wherein creating the first generated texture comprises:
receiving a portion of the texture;
transforming vertices of the portion of the texture by projecting positions of the vertices into final rendering screen coordinates; and
storing the first generated texture in a memory; retrieving the stored, first generated texture; and rendering the stored first generated texture in the first frame; and wherein the rendering of the first generated texture in the first frame further comprising
determining a set of sorted objects by sorting the objects based on a layering from top to bottom;
determining an on-screen area of the top object of the sorted objects;
rasterizing the on-screen area of the top object;
retrieving the next lower object from the set of sorted objects;
determining an on-screen area of the next lower object;
determining a non-overlapped area of the on-screen area;
rasterizing the non-overlapped area; and
rendering the rasterized non-overlapped area.

* * * * *